Apr. 3, 1923.
R. W. BARTON.
METHOD OF AND MEANS FOR THE PRODUCTION AND USE OF STEAM.
ORIGINAL FILED DEC. 11, 1916.
1,450,405.
5 SHEETS—SHEET 1.
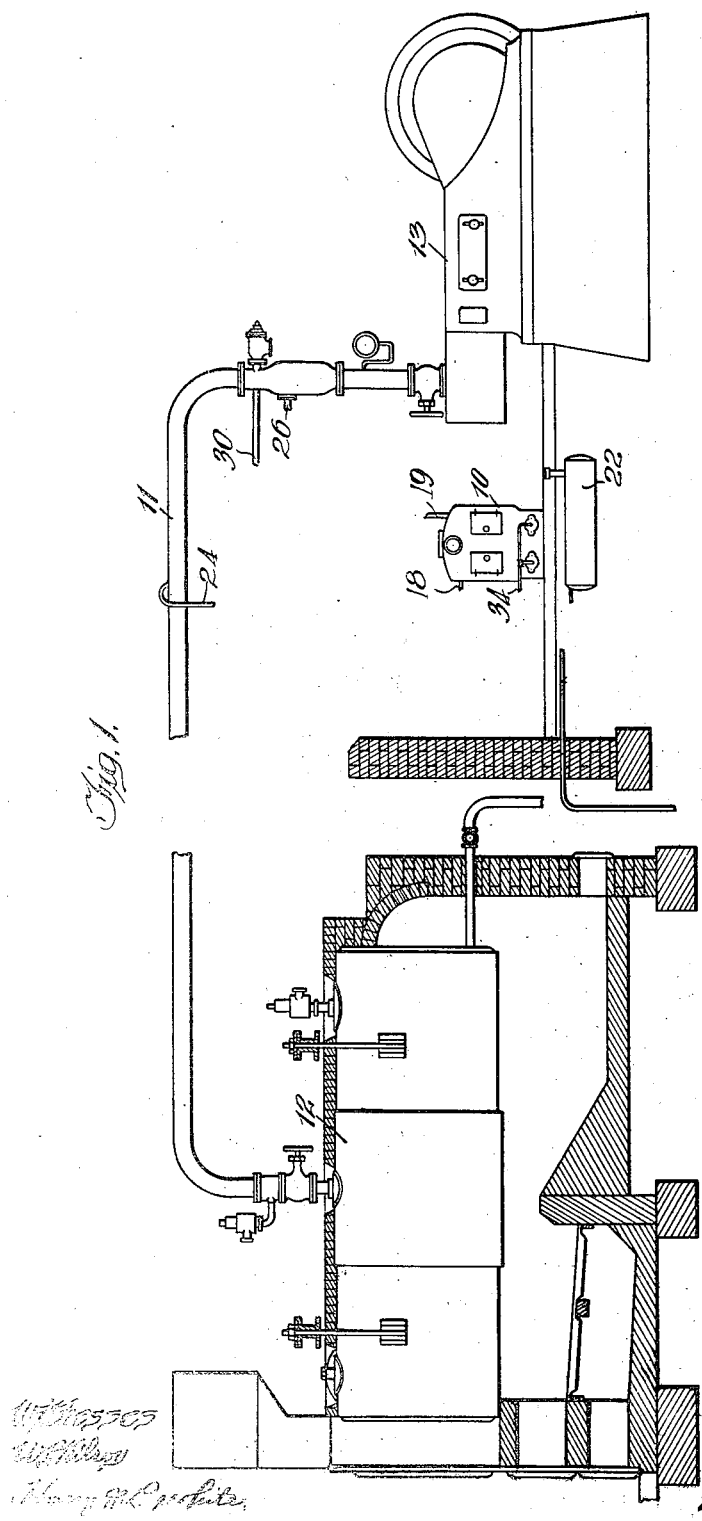
Inventor:
Robert W. Barton
By Edward Jay Wilson
Atty.

Apr. 3, 1923.
R. W. BARTON.
METHOD OF AND MEANS FOR THE PRODUCTION AND USE OF STEAM.
ORIGINAL FILED DEC. 11, 1916.
1,450,405.
5 SHEETS—SHEET 3.
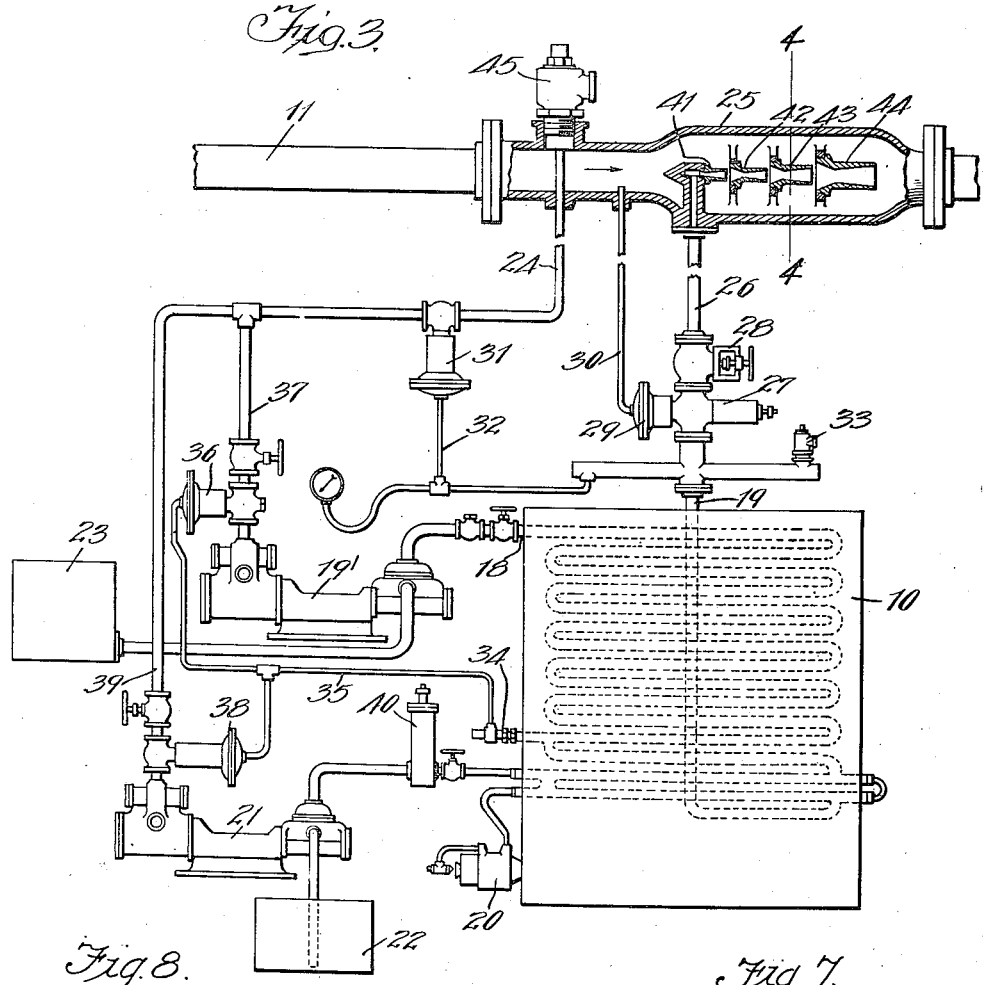
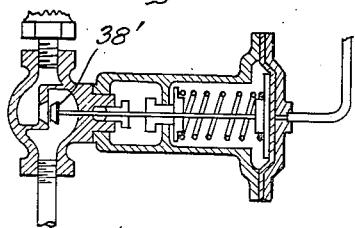
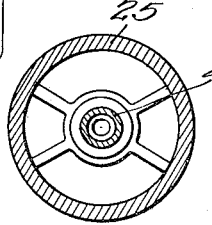
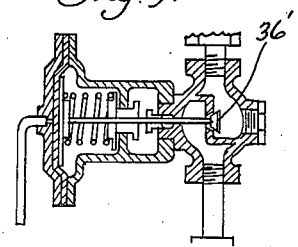
Witnesses:
W. T. Kilroy
Harry R. L. White
Inventor
Robert W. Barton
By Edward Jay Wilson
Atty.

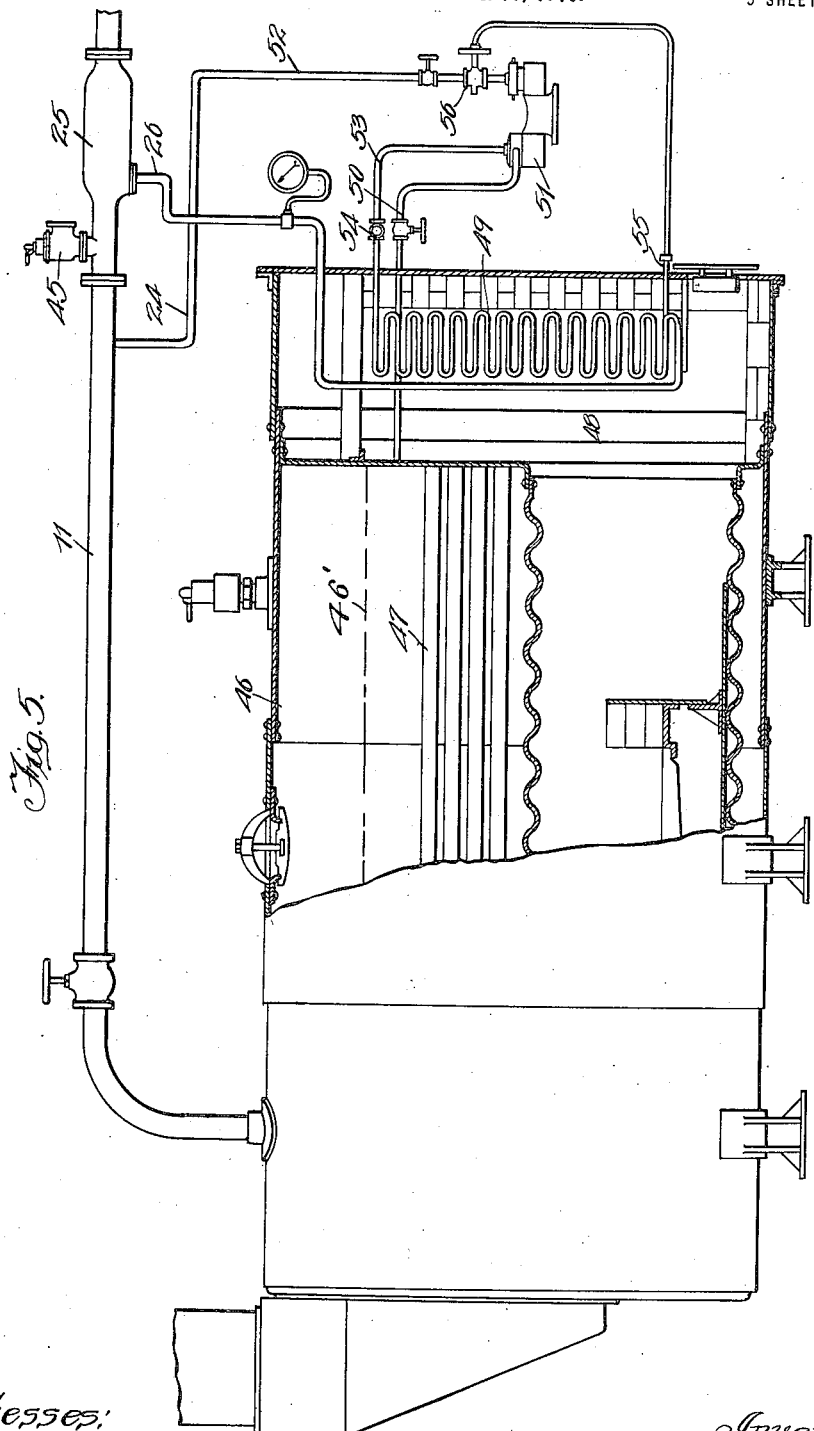

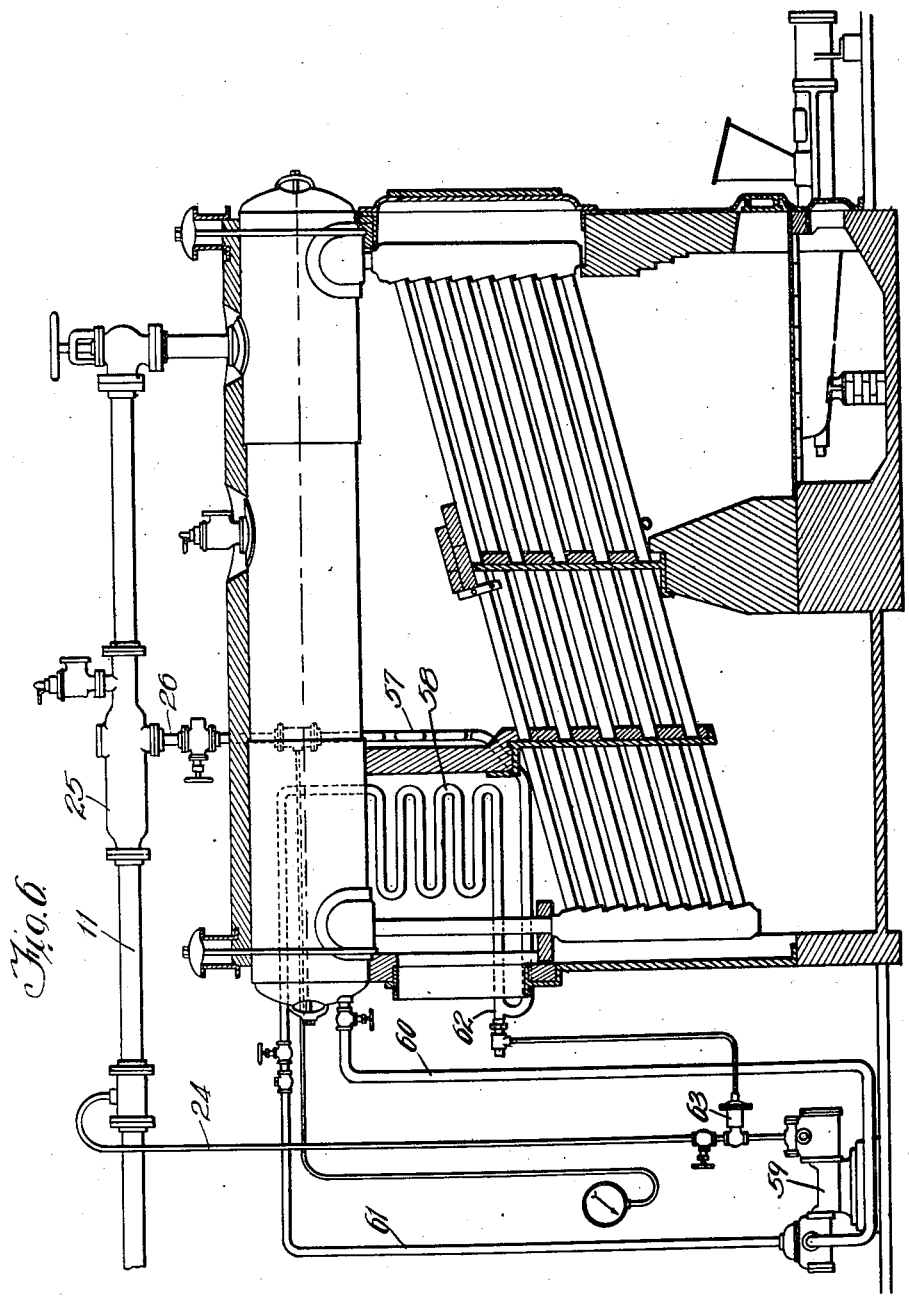

Patented Apr. 3, 1923.

1,450,405

UNITED STATES PATENT OFFICE.

ROBERT W. BARTON, OF CHICAGO, ILLINOIS.

METHOD OF AND MEANS FOR THE PRODUCTION AND USE OF STEAM.

Application filed December 11, 1916, Serial No. 136,257. Renewed March 30, 1922. Serial No. 548,149.

*To all whom it may concern:*

Be it known that I, ROBERT W. BARTON, a citizen of the United States, and a resident of Chicago, county of Cook and State of Illinois, have invented certain new and useful Improvements in Methods of and Means for the Production and Use of Steam, of which the following is a specification.

My invention relates to improvements in methods of and means for producing steam and gaseous vapors of certain predetermined qualities of temperature, pressure, etc.

The object of my invention is to eliminate the difficulties which have heretofore apparently been inherent in the production and use of high temperature and high pressure steam; to provide a system whereby steam power may be more economically produced; whereby saturated steam of different pressures and temperatures can be economically raised in temperature and pressure, either or both, as may be desired to fulfill the varied necessities of modern manufacturing methods and processes; to provide steam having any desired pressure and temperature desired and automatically control the production of same; to provide improved means for economically adding to the production and application of steam in a power plant subject to peak loads or constant over load; or for the purpose of economically regenerating exhaust steam for use in low pressure turbines etc. or for manufacturing processes requiring the use, application or transmission of heat.

Theoretically many economies are possible by the use of steam in the production of power, but such use has, so far, been accompanied by so many drawbacks as to make the ultimate economy doubtful.

The usual method in the production of superheated steam is to first produce saturated steam and then direct all or a portion of the saturated steam through a superheater. The pipe line friction in the usual superheater loops causes a considerable drop in pressure, sometimes as much as 25 pounds.

The above mentioned and many other difficulties and losses are eliminated by the use of my improved methods and means.

My invention consists in the improvements in the production and control of high temperature and high pressure steam, in the methods of mixing or tempering of steam, and in the means for effecting such steps, as hereinafter described and particularly pointed out in the appended claims.

My invention will be more readily understood by reference to the accompanying drawings forming part of this specification and in which I have shown several arrangements of apparatus for practicing my invention, illustrating some of many different uses for which my improvements are particularly adapted and also specifically illustrating certain improvements in devices and arrangements of apparatus which make possible the successful practice of my improved method.

In said drawings; Fig. 1, is a fragmentary view, partly in section, and partly in elevation, illustrating my invention applied to a power plant, for the purpose of adding to or increasing both the quantity of power and efficiency of power production;

Fig. 2, is a similar view showing diagrammatically the application of my invention to the regeneration of exhaust steam for manufacturing processes requiring heat;

Fig. 3, is a diagrammatic elevation, partly in section presenting a typical arrangement of regulating devices for controlling the production of steam and illustrating in detail my improved injector mixer;

Fig. 4, is a detail section on the line 4—4 of Fig. 3;

Fig. 5, is a diagrammatic view partly in section and partly in elevation showing the application of my invention to an internally fired boiler;

Fig. 6, is a view similar to Fig. 5 and showing a water tube boiler equipped with my improved controlling devices and by which my improved method can be employed; and Figures 7 and 8 are sectional views of two of the controlling valves.

My invention involves the use of a suitable steam generator 10, which is adapted to deliver steam of high pressure and high temperature to a steam line or conduit 11, the conduit 11 being adapted to conduct or supply saturated steam of a pressure and temperature lower than the product or output of the steam superheater. In Fig. 1 of the drawings I have shown the superheater 10, delivering its product to the low pressure steam line 11, which steam line is supplied with saturated steam from an ordinary steam boiler 12. In this instance the steam is employed to run a steam engine 13 and this indicates one specific application of my invention, namely for the purpose of increasing the power output of a steam power plant. For instance the power called for from the plant may be at times in excess of the output of the boiler 12 whereas if steam of sufficient pressure and temperature can be supplied to the engine the power plant as a whole can carry the excess load.

In Fig. 2 I have illustrated the specific application of my invention to the regeneration of exhaust steam coming from the exhaust pipe 14, of an engine 15. The regenerated steam in this illustration is used for manufacturing processes in the heating of a steam jacketed kettle 16 and for use in the rendering tank 17. It is obvious that the regenerated exhaust steam which may be heated to any desired degree of temperature and maintained at a relative low pressure can be used for many manufacturing processes and purposes wherein heat is necessary.

In Fig. 3, I have shown the generator 10 and the associated regulating devices in enlarged form for descriptive purposes. The generator 10 has an inlet 18 for water and and outlet 19 for steam. In Fig. 3 I have shown a steam pump 19' connected to deliver water into the generator through the inlet 18. While heat from different fuels and sources can be applied to the superheater, with appropriate modifications of my improved means for regulating the operation of the generator. I have shown as a typical illustration merely, a fuel oil burner 20 supplied with fuel oil by means of the steam pump 21 drawing the fuel from a tank 22. The steam pump 19' is shown drawing the water supply from a water tank 23. The steam pumps 19' and 21 are operated by steam drawn from the steam line 11 through the connecting or supply pipe 24 which is branched to each of the steam pumps.

While the generated steam can be added to and mixed with the saturated steam in many ways and advantageous results secured I prefer to provide an injector fitting 25 of novel and effective construction which I connect in the steam line 11 and I connect this fitting with the outlet 19 of the generator by means of a connecting pipe 26. In the connecting pipe 26 I provide a regulating or shut off valve 27 and a hand stop valve 28. The valve 27 is a diaphragm valve and I subject the diaphragm 29 of the valve 27 to the pressure in the steam line 11 by means of the connecting pipe 30, which I connect to the steam line immediately at the rear of the connection therewith of the generated steam supply pipe 26. The flow of saturated steam in the pipe line 11 is in the direction of the arrow therein. The valve 27 is adapted to be closed by a rise of pressure in the steam line 11 above a predetermined point and thereby shut off the flow of generated steam from the superheater 10 into the pipe line 11.

In the steam pipe 24 which supplies steam to the pumps 19' and 21 I place a diaphragm shut off valve 31 and I operate this valve by the pressure in the generator through a connecting pipe 32. This pipe 32 connects with the outlet of the generator below the valve 27. At this point I also provide a safety valve 33.

When the pressure in the steam line 11 rises above a predetermined point the valve 27 is closed thereby and the pressure in the generator rises very rapidly; the valve 31 being adapted to be closed by this rise in pressure in the generator and thus cut off the supply of steam to the steam pumps 19' and 21 and thereby stop the supply of feed water and fuel to the generator and thus control the output of the generator relatively to the pressure in the low pressure or saturated steam line 11.

If for any reason the pressure should rise beyond a predetermined point in the generator, even though the valve 27 is open it is obvious that the valve 31 would close and thus shut down the generator.

In addition to the control of the generator as explained by means of the pressure in the generator and the auxiliary control by the pressure in the saturated steam line. I also provide a thermostatic control of the generator so that it can not become overheated. This control comprises a fluid thermostatic device 34 which is projected into the superheater and is subject to the temperature thereof. I connect this fluid thermostatic device by means of a connecting pipe 35 with a diaphragm valve 36 arranged in the branch 37 of the steam pipe 24 which supplies steam to the feed water pump 19' and I also connect it to a diaphragm valve 38 arranged in the branch 39 of the steam supply pipe 24 which supplies steam to the fuel feed pump 21. The diaphragm valve 36, as shown, is adapted to be opened by a rise in temperature in the generator and thus feed more water thereto and thereby reduce the temperature of the generator and the diaphragm valve 38 is adapted to be closed by a rise of temperature in the generator and thereby reduce the quantity of fuel which the fuel pump 21 feeds to the generator and thereby also reduce the temperature of the generator. The diaphragm which controls the valve 36 operates to force the valve head 36', Figure 7, away from its seat upon an increase of pressure in the generator and the diaphragm controlling the valve 38 operates to force the valve head 38' Figure 8. upon its seat upon an increase in pressure in the generator thus in the first instance causing an increased flow of water to the generator and in the second instance causing a decrease in the flow of fuel oil to the generator burner. Between the fuel feed pump 21 and the generator I arrange a suitable pressure accumulator 40 which reduces the variation of pressure on the fuel oil feed due to the pulsations of the fuel feed pump.

It is to be noted; first, that the generator is not supplied with saturated steam as in the ordinary form of generator but is supplied with water, second, that the water supply of the generator is independent of the supply of saturated steam in the steam line 11. This is a wide digression from the usual practice wherein the generator is usually supplied with saturated steam from the primary source of saturated steam.

The generator 10 is one which is adapted to produce steam of very high temperature and very high temperature and my improved method of mixing superheated steam with saturated steam is best carried out through the medium of the apparatus just described in connection with the injector fitting 25. This fitting 25, in the form illustrated, which may take many forms suitable for specific installations, is an elongated tube-like fitting and is provided with a centrally located injector nozzle 41 connected through the side of the fitting to the generated steam delivery pipe 26 and is adapted to inject the generated steam in the steam line 11 in the direction of flow of the saturated steam therein.

I preferably provide a series of combined expansion tubes and nozzles 42, 43 and 44 in the ejector fitting 25 and in alignment with the injector nozzle 41. Each of these expansion tubes is larger than the one from which it receives the steam and the center opening of each thereof is formed similar to a Venturi tube having a shorter tapered section at its rear end and a longer tapered section at its forward end, the smallest diameter being positioned about one third its length from its rear end. The forward end of each tube is spaced slightly away from the rear end of the adjacent tube. These tubes are all considerably smaller than the cross section of the fitting and as the high pressure and high temperature steam escapes from the nozzle 41 passes through and expands in the several tubes 42, 43 and 44 it draws with it the saturated steam flowing in the steam line 11 and effects a complete combination and mixing of the saturated steam with the generated steam thereby proportionately raising the temperature and pressure, either or both of the resultant product relatively to that of the saturated steam. Such action of the generated steam in the injector fitting 25 normally tends to slightly reduce the pressure in the steam line 11 immediately to the rear of the point of injection of the generated steam and the additional volume introduced at high velocity increases the pressure in the direction of flow.

During the normal operation of the plant the resultant mixture will be used as fast as produced but when it occurs that the product is not used as fast as produced the pressure will naturally rise in the steam line 11 and when this occurs the diaphragm valve 29 will decrease or stop the flow of generated steam from the generator into the steam line 11 and thus prevent too great a rise in pressure in the steam line 11. In the same manner the lowering of the pressure in the steam line will automatically start or increase the flow of steam from the generator into the steam line 11.

It is to be noted that I prefer to form the injector fitting 25 as a solid or one piece fitting and that I so proportion the several mixing tubes that the several tubes can be progressively mounted into position through the several openings in which the tubes are secured. In other words the injector nozzle 41 can be mounted in position through the openings in which the tubes 42, 43 and 44 are secured likewise the tube 42 can be placed in its position through the openings in which the tubes 43 and 44 are mounted and similarly the tube 43 can be placed in position.

As a measure of precaution I provide a safety valve 45 on the injector fitting 25.

My invention is equally applicable to a steam generator which, instead of having an independent fuel supply is designed to be heated by the gases of combustion in connection with the boiler which produces the saturated steam. And in Fig. 5, I have shown such an installation. In this figure I have illustrated an internally fired boiler 46 having return fire tubes 47 and a fire space 48 at the rear end of the boiler. In this space 48 I have mounted a steam generator 49. The saturated steam is delivered from the boiler through the saturated steam pipe line 11. While I might supply the generator with water from any suitable source either cold or hot I have shown, in this instance, the generator 49 being supplied with water from the boiler 46 through the connection 50 and by means of the steam pump 51. The steam pump is adapted to be operated by saturated steam through the supply pipe 52 which is connected with the saturated steam line 11 and is adapted to draw water from the boiler 46 below the water line 46' thereof and deliver it to the generator 49 through the delivery pipe 53 in which I place a check valve 54. Once the water has passed the pump it can not return to the boiler 46 and hence the water supplied to the generator 49 can be considered as from a source of feed water independent of the source of saturated steam.

A particular and valuable feature of this improvement is that I am enabled to increase the output of the boiler as a whole for I do not depend upon nor lessen materially the output of saturated steam from the boiler but I supplement the output thereof by the capacity of the generator. In fact the generator, in this instance, provides evaporation, supplemental to that of the boiler proper, and from the same source of heat.

I deliver the saturated steam into the steam line 11 through one of my improved injector fittings 25 similar to that already described.

I control the production of high temperature and high pressure steam in this instance by the temperature, preferably of the hottest part of the generator, through a thermostatic device 55 which I connect to a diaphragm valve 56 located in the steam supply pipe 52 and adapted, as the temperature rises in the superheater to open the diaphragm valve 56 for supplying more water to the generator.

In Fig. 6, I have illustrated the adaptation of my invention for use with water tube boilers. I have illustrated such a boiler at 57. The generator 58 in this instance is located in the path of the gases of combustion and I provide as in the former instance, a steam pump 59 which is driven by steam drawn from the pipe line 11 and is adapted, through the connection 60, to draw water from the boiler 57 below the water line thereof and force it into the superheater through the connection 61. In this instance also I connect the delivery end of the generator with one of my improved injector fittings 25 arranged in the saturated steam line 11. In this instance also I control the action of the steam pump thermostatically by means of a thermostatic device 62 exposed to the temperature of the most highly heated portion of the generator and adapted to operate a diaphragm valve 63 controlling the flow of steam to the steam pump 59.

It is to be noted that even when arranged in connection with the boilers which supply the saturated steam. the supply of feed water to the generator is substantially independent of the supply of saturated steam and although I draw the water from the boiler supplying the saturated steam the steam pump which forces the water into the generator forms practically a cut off between the saturated steam boiler and the generator and the supply of feed water to the generator can be expressed as being independent of the supply of saturated steam.

By means of my several automatic controlling devices and the improved injector through and by which I mix and combine the high temperature and high pressure steam with the saturated steam I am enabled to control the output of the generator to produce the results desired. For instance suppose, as illustrated in Fig. 1, and Fig. 3, we have a boiler and engine and it is desired to produce more power than the boiler is capable of and that the engine is large enough to produce all of the power desired. We will also suppose that the boiler is limited in its pressure to one hundred pounds and the engine is suitable for using steam at a higher pressure. In this application of my invention I adjust the diaphragm valve 27 to be closed when the pressure in the saturated steam rises a few pounds above one hundred and I adjust the several feeds so that the generator will produce high pressure steam at several hundred pounds pressure. The injection of this high pressure high temperature steam into the steam line 11 will increase the pressure, beyond the injector, to the point desired and so long as the resultant product of the mixture of generated and saturated steam is being used by the engine the pressure at the rear of the point of injection of the generated steam will not rise sufficiently to shut off the flow of generated steam, but when it occurs that the power demand drops down so that the whole of the generated steam is not necessary the pressure will increase in the saturated steam line 11 and this will operate through the devices described to cut off or lessen the supply of generated steam and decrease or stop the production thereof. In like manner the several devices will operate to automatically control the production of the resultant mixture in the instance shown in Fig. 2 where the generated steam is used for regenerating exhaust steam.

Where the generator is arranged to be heated by the gases of combustion of the boiler producing the saturated steam, the controlling of the production of the generated steam is slightly different in that the supply of water to the generator and consequently the output of generated steam is in proportion to the temperature of the gases of combustion. The temperature of gases of combustion is somewhat proportional to the demands on the boiler for steam and in this manner when the demand for power is increased the combustion of fuel is increased. for the purpose of meeting the demand, and the temperature consequently is high and the output of the generator is increased through the medium of the thermostatic control. In the same manner when the demand for steam is reduced the temperature of the gases of combustion is somewhat proportionally reduced and in consequence the output of superheated steam from the superheater is reduced through the medium of the thermostatic control.

As many applications and modification of my invention will readily suggest themselves to one skilled in the art I do not limit or confine my invention to the specific steps herein described or to the use of the specific arrangements or structure of apparatus and devices shown and described.

I claim:—

1. The herein described method of combining and mixing saturated steam and steam of high temperature and high pressure which consists in feeding water to a generator and producing high temperature and high pressure steam, causing saturated steam to flow through a conduit, injecting the generated steam into the stream of saturated steam, and controlling the pressure of the generated steam relative to the pressure of the saturated steam.

2. The herein described method of combining and mixing saturated steam and steam of high temperature and high pressure which consists in feeding water to a generator and producing high temperature and high pressure steam, causing saturated steam to flow through a conduit, injecting the generated steam into the stream of saturated steam in the direction of flow thereof, and controlling the pressure of the generated steam relative to the pressure of the saturated steam.

3. The herein described method of combining and mixing saturated steam and steam of high temperature and high pressure which consists in feeding water to a steam generator and producing steam of relatively high temperature and pressure, causing saturated steam to flow through a conduit, injecting the generated steam into the stream of saturated steam in the direction of flow thereof, and governing the output of the generator by automatically controlling the supply of water and fuel thereto relative to the pressure of the saturated steam.

4. In a steam producing and controlling system, a relatively high pressure steam generator, fuel and water supply therefor, automatic means for regulating the supply of fuel and water thereto controlled by the pressure in the generator, a supply of lower pressure steam, means for injecting the output of the generator into the lower pressure steam and auxiliary means controlled by the pressure of the lower pressure steam for controlling the fuel and water supply of the generator.

5. In a steam producing and controlling system, a high pressure steam generator, fluid fuel and water supply therefor, automatic means for regulating the supply of fuel and water thereto controlled by the pressure in the generator, a steam main through which flows a stream of low pressure steam, means for injecting the output of the generator into the stream of low pressure steam in the direction of flow thereof, and auxiliary means controlled by the pressure in the low pressure steam main, for controlling the fuel and water supply of the generator.

6. In a steam system, a relatively low pressure steam main, means independent of the supply of the lower pressure steam for generating high pressure steam, connection between said independent means and the lower pressure steam main, and injector means for introducing the generated steam from the independent means into the low pressure steam main and fuel and water control means for the steam generator connected with the low pressure main at the rear of the point of introduction of the high pressure steam.

In testimony whereof, I have hereunto set my hand this 1st day of November, 1916, in the presence of one subscribing witness.

ROBERT W. BARTON.

Witness:
EDWARD FAY WILSON.